United States Patent Office 3,591,562
Patented July 6, 1971

3,591,562
HETEROCYCLIC POLYMERS
Tad L. Patton, Baytown, Tex., assignor to
Esso Research and Engineering Company
No Drawing. Filed Nov. 24, 1967, Ser. No. 685,311
Int. Cl. C08g 22/00
U.S. Cl. 260—77.5    7 Claims

ABSTRACT OF THE DISCLOSURE

New heterocyclic polymers having the same heterocyclic ring system are produced by the reaction of diisocyanates with hydrogen cyanide, by the reaction of dicyanoformamides with diisocyanates, and by the polymerization of cyanoformamidyl isocyanates in the presence of an effective catalyst. The heterocyclic polymers are characterized by repeating units which contain either or both 4-imino-1,3-imidazolidine-2,5-dione-1,3-diyl rings and 5-imino-1,3-imidazolidine-2,4-dione-1,3-diyl rings. The imino group on the foregoing rings may be modified by replacement of the imino hydrogen by acyl groups such as carbamoyl or the imino group may be replaced with oxygen.

BACKGROUND OF THE INVENTION

The present invention is directed to a new family of heterocyclic polymers and their preparation. The heterocyclic polymers are characterized by repeating units which contain the substituted 1,3-imidazolidine-1,3-diyl ring as follows:

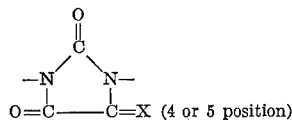

where: X is NH, N— or O

The reaction of monoisocyanates with hydrogen cyanide is known as disclosed by W. Dieckmann et al., Berichte 38, 2977 (1905). It has been disclosed by S. Petersen in Annalen der Chemie 562, 205–226 (1949) that hexamethylene dicyanoformamide is formed by the reaction of hydrogen cyanide with hexamethylene diisocyanate. There is no disclosure, however, of the formation of useful polymers having the characteristics of the repeating units containing the imidazolidine ring as set forth above and being useful in the formation of films, fibers, foams, and molded objects.

SUMMARY OF THE INVENTION

New heterocyclic polymers are formed by one of several methods each of which may be characterized by the presence of imidazolidine rings (below).

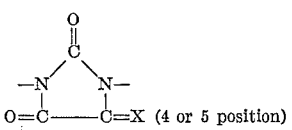

where: X is NH, N— or O

The particular method for preparing the polymers of the present invention will to a large degree determine the ultimate structure of the polymer and its physical characteristics. Polymers containing the 4 (or 5)-imino-1,3-imidazolidine-2,5 (or 4)-dione-1,3-diyl structure are characterized by specific absorption bands in the carbonyl region at 5.55–5.60, 5.72–5.78, and 5.92–6.0μ in the infrared spectrum. The infrared spectra of polymers containing the 1,3-imidazolidine-2,4,5-trione-1,3-diyl structure have a broad characteristic absorption band at 5.7–6.0μ.

The carbamoylimino group is formed by the reaction of an isocyanate with the imino group on the heterocyclic ring; the infrared spectrum of the 4-carbamoylimino-1,3-imidazolidine-2,5-dione ring is characterized by four absorption bands at 5.55–5.6, 5.72–5.78, 5.8–5.90, and 6.05–6.10μ. The several methods for preparing the heterocyclic polymers of the present invention will be described in detail separately.

(I) Polymers from reaction of hydrogen cyanide with a diisocyanate

Any of the following general procedures may be used to prepare polymers by the reaction of hydrogen cyanide with a diisocyanate:

(a) hydrogen cyanide may be added as a gas, liquid, or solution to a solution of a diisocyanate, a catalyst, and a solvent;
(b) a solution of hydrogen cyanide and a diisocyanate may be added to a catalyst solution; and
(c) a catalyst may be added to a solution of hydrogen cyanide, a diiso- and a solvent.

The polymers formed by the reaction of hydrogen cyanide with diisocyanates are generally insoluble in most solvents. These polymers further show swelling in selected solvents and are infusible below the decomposition temperature. The foregoing properties indicate that cross-linking occurs. This cross-linking is most likely to occur by reaction of some of the imino groups in the heterocyclic rings with isocyanate groups. The isocyanate group may be an isocyanate end-group on a polymer chain or one of the isocyanate groups on unreacted diisocyanate monomer. Accordingly, the polymers formed by the reaction of hydrogen cyanide with diisocyanates are characterized by units which contain either the 4-imino-1,3-imidazolidine-2,5-dione-1,3-diyl ring or the 5-imino-1,3-imidazolidine-2,4-dione-1,3-diyl ring. If cross-linking occurs by the reaction described above, some of the imino hydrogens will be replaced by carbamoyl groups.

The resulting polymers formed by the reaction of hydrogen cyanide with diisocyanates may be hydrolyzed under mildly acidic conditions to polymers characterized by repeating units containing the 1,3-imidazolidine-2,4,5-trione-1,3-diyl ring illustrated by the following general structure:

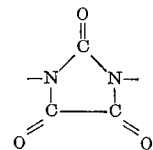

These polymers are not cross-linked if hydrolysis conditions are sufficiently strong to cleave the carbamoylimino groups.

(II) Polymers from reaction of dicyanoformamides with diisocyanates

The new heterocyclic polymers of the present invention are produced by reacting a dicyanoformamide or mixture of dicyanoformamides with a diisocyanate or a mixture of diisocyanates in an appropriate solvent and using an effective catalyst. The polymers formed by the reaction of dicyanoformamides with diisocyanates are generally soluble polymers. The polymers differ from those made in Method I in the following ways:

(a) The polymers made from the reaction of a diisocyanate with a dicyanoformamide have imidazolidine rings on which the imino group is located on the position (alternately 4 and 5) adjacent to the ring N-atom which was derived from the diisocyanate. The position of the imino group on the imidazolidine ring regularly alternates between the 4 and 5 positions on adjacent rings whereas the imino group in polymers formed by Method I is randomly distributed between the 4 and 5 positions on adjacent rings.

Theoretically, identical polymers will be produced by the hydrolysis of polymers made by both Methods (I and II) where the organic moiety of the reactants forming the polymers are all the same and identical. The hydrolyzed polymers are characterized in that the heterocyclic rings are essentially all imidazolidine-2,4,5-trione rings.

(b) If the organic moieties of the diisocyanate and the dicyanoformamide are different, the polymers have essentially an alternating 1:1 structure relative to the organic moiety of the diisocyanate and dicyanoformamide; whereas, polymers made by Method I (direct reaction of HCN with a mixture of two diisocyanates) have a 1:1 composition (relative to the diisocyanates), but the organic moieties would not necessarily occur in an alternating sequence. Further, two polymers may be produced which differ one from the other only by the position of the imino groups relative to the organic moieties by reacting a diisocyanate with a dicyanoformamide with different organic moieties and then reversing the organic moiety in the diisocyanate and dicyanoformamide. In Method I where two diisocyanates are used, there would be random distribution of the imino groups between positions 4 and 5 particularly if the two diisocyanates had the same reactivities.

(III) Polymerization of cyanoformamidyl isocyanates

The polymerization of cyanoformamidyl isocyanates to produce the new heterocyclic polymers of the present invention may be carried out in a suitable solvent and in the presence of an effective catalyst and/or by heating. The cyanoformamidyl isocyanates used in the polymerization have the general formula.

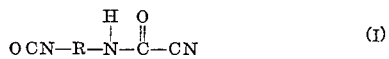   (I)

where: R is the organic moiety of the cyanoformamidyl isocyanate which may be aliphatic, alicyclic, aromatic, or mixtures thereof and functionally substituted derivatives thereof provided the functional group does not react with the isocyanate group.

The heterocyclic polymers produced by polymerizing the cyanoformamidyl isocyanates are generally soluble and thus, they may be characterized as having essentially no or little cross-linking. The polymers formed from cyanoformamidyl isocyanates differ structurally (with regard to the imino group) from those made by Methods I and II in that the imino group is regularly located at position 4. Hydrolysis of polymers formed by this method will produce polymers again characterized by the presence of the 1,3-imidazolidine-2,4,5-trione-1,3-diyl rings.

DESCRIPTION OF THE PREFERRED EMBODIMENTS

The new family of heterocyclic polymers of the present invention as set forth in the Summary of the Invention above are all ultimately derived by the reaction of hydrogen cyanide with a diisocyanate or mixture of diisocyanates and may be produced by three distinct methods. A specific polymer produced by a specific method and/or from a specific diocyanate or mixture of diisocyanates may differ over a wide range of chemical and physical properties from another polymer produced by one of the other methods and/or from another diisocyanate or mixture of diisocyanates. These differences in chemical properties stem in part from the specific polymerization reaction used to produce the polymer as well as in part from the vast number of diisocyanates, dicyanoformamides, and cyanoformamidyl isocyanates which may be used as starting materials. To illustrate the present invention in all of its ramifications, each of the methods of producing the new heterocyclic polymers will be considered individually.

(I) Reaction of hydrogen cyanide with diisocyanates

The diisocyanates which may be used in the reaction with hydrogen cyanide are characterized by the formula:

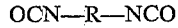

where: R is the organic moiety of the diisocyanate which may be aliphatic, alicyclic, aromatic, or mixtures thereof and functionally substituted derivatives thereof provided the functional group does not react with an isocyanate group.

Thus, the diisocyanates may be selected from a broad group having a large variety of organic moieties. The organic moieties of the diisocyanates may be substituted with functional groups such as sulfoxy, sulfonyl, alkoxy, aryloxy, oxo, ester, alkylthio, arylthio, nitro and the like which do not react with the isocyanate group. Functional groups which have active hydrogen atoms (i.e., carboxylic acids, phenols, amines, etc.) should not be present.

Each diisocyanate is characterized by a specific hydrocarbon moiety. For example, those diisocyanates having an aliphatic hydrocarbon moiety are exemplified by tetramethylene diisocyanate; hexamethylene diisocyanate; dodecamethylene diisocyanate; 2,2,4-trimethyl pentenyl-1,5-diisocyanate; and the like. Diisocyanates characterized by having aromatic hydrocarbon moieties are exemplified by m-phenylene diisocyanate; p-phenylene diisocyanate; biphenylene diisocyanate; 1,5-naphthalene diisocyanate and the like. A diisocyanate having an alicyclic hydrocarbon moiety is 1,4-cyclohexylene diisocyanate. The diisocyanates containing more than one type of hydrocarbon moiety are exemplified by toluene diisocyanate, durene diisocyanate, 4,4'-diphenylmethane diisocyanate; 3,3'-dimethyl - 4,4' - biphenylene diisocyanate; 4,4'-diphenylisopropylidene diisocyanate; p-xylylene diisocyanate; m-xylylene diisocyanate, 4-(4-isocyanatocyclohexyl) phenylisocyanate, and 4-isocyanatobenzyl isocyanate; and the like. It is noted by the foregoing examples that the isocyanate groups in each of the diisocyanates are attached to the same or different organic moieties. Further, diisocyanates which have the organic moiety functionally substituted may also be used and are exemplified by 4,4'-diphenylsulfone diisocyanate; 4,4'-diphenylether diisocyanate; 3,3' - dimethoxy - 4,4' - biphenylene diisocyanate; di(3-isocyanatopropyl) ether and the like. Further, specific diisocyanates which may be used in the present invention are found in patents, articles, or organic textbooks; a specific example being the paper "Mono and Polyisocyanates" by W. Siefken, Annalen der Chemie 562, 6–136 (1949), which is incorporated herein by reference.

The formation of the heterocyclic rings in the polymer chain involves a series of three reactions: (1) addition of HCN to an isocyanate group with the formation of a cyanoformamide, (2) the reaction of this cyanoformamide group with another isocyanate group to form a cyanoformyl urea, and (3) the cyclization of this cyanoformyl urea to the 4-imino-1,3-imidazolidine-2,4-dione-1,3-diyl ring. These reactions are illustrated as follows:

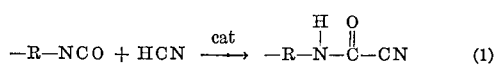   (1)

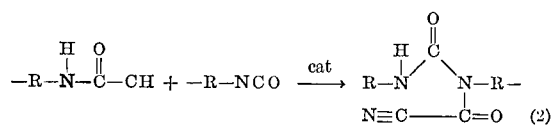   (2)

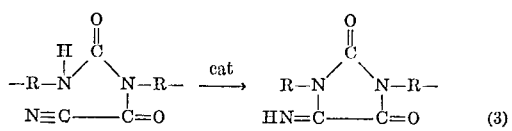   (3)

As indicated in the above, a catalyst is required for each reaction. The choice of catalysts required to promote only reaction (1), however, would not necessarily be the same used to promote reactions (2) and (3). In the reaction of hydrogen cyanide with diisocyanates to form polymers in one step, a catalyst is used having sufficient activity to promote all three reactions. Catalysts having this activity are tertiary nitrogen compounds which have no active hydrogen atoms. The preferred catalysts, therefore, for producing polymers by the reaction of hydrogen cyanide with diisocyanates are tertiary amines such as triethylamine, triethylenediamine, 1-aza-3,3,7,7-tetramethyl bicyclo (3.3.0) octane, 1-methyl piperidine, and the like.

Suitable solvents to be used in forming polymers of the present invention by the reaction of a diisocyanate or mixture of diisocyanates with hydrogen cyanide are those in which the products formed by reactions (1), (2), and (3) are soluble. The dipolar aprotic solvents such as dimethylformamide, dimethylacetamide, dimethylsulfoxide, hexamethylphosphoramide and the like are preferred. However, in the reactions using a diisocyanate having an aliphatic hydrocarbon moiety, aromatic solvents such as benzene, toluene, xylene, chlorobenzene, and the like are suitable. The choice of solvent may be important in certain instances since the molecular weight of the polymer formed may be limited by its solubility in the solvent used in the reaction. Anhydrous solvents are used since water will react with the isocyanate group.

The reaction of the diisocyanates with hydrogen cyanide to produce the heterocyclic polymers of the present invention is normally carried out under ambient and anhydrous conditions. The reaction is exothermic so that cooling is usually required in order to control the temperature within the range of 10° to 25° C. At higher temperatures, pressure equipment becomes necessary due to the volatility of hydrogen cyanide (B.P. 25° C.). The reaction may be carried out at lower temperatures with decreased rates of reaction as well as at higher temperatures if desired. The reaction is carried out under a blanket of inert gas such as nitrogen to exclude oxygen due to the fact that hydrogen cyanide is explosive in the presence of oxygen.

The reaction to product the new heterocyclic polymers of the present invention may be carried out by any of the following general procedures: (a) adding hydrogen cyanide as a gas, liquid, or solution to a solution of a diisocyanate and a catalyst in a solvent; (b) adding a mixture of hydrogen cyanide and a diisocyanate in a solvent to a catalyst solution; and (c) adding a catalyst to a solution of hydrogen cyanide and a diisocyanate in a solvent. In any one of the foregoing procedures, hydrogen cyanide may be produced in situ from a compound such as acetone cyanohydrin.

In the reaction where hydrogen cyanide is used as a reagent, another reaction may occur, that being the addition at the imino hydrogen atom on the heterocyclic ring to an isocyanate group. This reaction is a side reaction which results in branching and/or cross-linking. This reaction may be illustrated as follows:

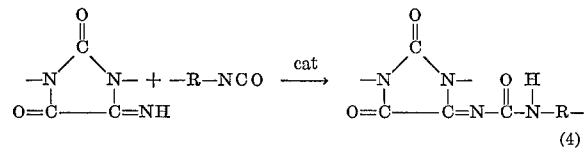

(4)

The isocyanate group (—R—NCO) may be on an unreacted diisocyanate or an end group on a polymer chain or any intermediate in the formation of a polymer chain. The branching or cross-linking reaction referred to above can be limited by controlling the reaction temperature and/or the order of addition of reactants. The extent of branching and/or cross-linking is sufficient to render the polymers formed by the reaction of diisocyanates with hydrogen cyanide insoluble in most solvents; such as chloroform, tetrahydrofuran, pyridine, m-cresol, dimethylformamide, dimethylsulfoxide, and hexamethylphosphoramide. Cross-linking has been observed to occur during the heating of thin films of polymer formed from hexamethylene diisocyanates. Furthermore, films formed by heat and pressure are rendered insoluble whereas the polymer powder was soluble in certain selected solvents.

The reaction of diisocyanates with hydrogen cyanide is illustrated by the following examples, which are set forth for illustration and are not to be considered as limiting the present invention.

EXAMPLE 1

A stream of dry hydrogen cyanide is slowly bubbled through a cold (6° C.) solution of 50.4 grams (0.2 mole) of diphenylmethanediisocyanate in 100 ml. of pyridine in a nitrogen atmosphere. The temperature is controlled between 6° and 10° C. The addition of 0.25 mole of hydrogen cyanide required 81 minutes, and at this point the reaction solution was very viscous. Methyl alcohol (5 ml.) is then added. The clear reaction solution is poured into petroleum ether and toluene in a Waring blendor to form a finely divided yellow powder. The yield was 56 grams (quantitative). The infrared spectrum did not reveal the presence of an isocyanate group, thus implying either that the molecular weight was very high and/or that considerable cross-linking occurred. The product was insoluble in chloroform, acetone, methylethylketone, isopropanol, tetrahydrofuran, ethyl acetate, formic acid, chlorobenzene, o-dichlorobenzene, m-cresol, pyridine, dimethylformamide (swelling), hexamethylphosphoramide (swelling), and dimethylsulfoxide (swelling); therefore, the product appears to be cross-linked. The product formed a film at 400° F. and 20 tons pressure. Thermogravimetric analysis of the film showed a weight loss of 4.7% at 300° C.

EXAMPLE 2

A solution of 20.1 grams (0.12 mole) of hexamethylene diisocyanate, 3.5 grams (0.13 mole) of hydrogen cyanide, and 72 grams of dry toluene is added dropwise to a warm (50° C.) solution of 1.67 grams (0.01 mole) of Arkam (1-aza-3,3,7,7-tetramethyl bicyclo (3.3.0) octane) in 28 grams of toluene. The reaction is done in a nitrogen atmosphere. The addition required 23 minutes and the temperature rose to 73° C. The temperature is maintained at 70° for an additional 100 minutes. A yellow-brown colored product separated from the solution. The product is filtered and washed with petroleum ether. The yield was 20.5 grams (88%). The product exhibited in the infrared spectrum absorption maxima at 3.06, 5.60, 5.78, and 6.00 microns. The product had an inherent viscosity of 0.17 in dimethylformamide (C, 0.5 g./100 ml.) at 25° C. The molecular weight by vapor phase osmometry in dimethylformamide at 100° C. was 1085. The thermogravimetric analysis showed a weight loss of 1.9% between room temperature and 250° C.; 1.4% at 250–300° C., and 5.5% loss at 300–400° C. A dark, transparent limber film was formed at 400° F.

EXAMPLE 3

To a solution of 42.5 grams (0.24 mole) of toluene diisocyanate and 8.1 grams (0.3 mole) hydrogen cyanide in 116 grams of toluene is added two (2) drops of triethylamine under a nitrogen atmosphere. The reaction is stirred and maintained at a temperature of 10–11° C. A precipitate begins to slowly form as the reaction is allowed to warm slowly to room temperature where it remained over night under a nitrogen blanket. The off-white product is collected on a filter, washed with petroleum ether and dried. The yield was 43.5 grams (88% yield). The product had an inherent viscosity in dimethylformamide (C, 0.5 g./100 ml.) of 0.03 at 25° C. A molecular weight of 575 was found by vapor phase osmometry in dimethylformamide at 100° C. The infrared spectrum showed absorption maxima at 3.08, 4.41, 5.52, 5.72, and 6.0 microns.

The foregoing examples illustrate some of the procedures which may be used in carrying out the reaction of diisocyanates with hydrogen cyanide.

EXAMPLE 4

A solution of 5 grams of hydrogen cyanide in 150 ml. of toluene is added to a solution of 50.4 grams of hexamethylene diisocyanate in 150 ml. of toluene containing 3 ml. of dry pyridine at 7° C. No temperature rise is noted. The reaction solution is allowed to warm to room temperature under nitrogen and to remain there for 60 hours. At the end of this period an infrared spectrum of the reaction solution revealed that none of the characteristic absorption peaks for polymers having the iminoimidazolidine dione ring was obtained. Thus, the weakly basic pyridine is ineffective in catalyzing the reactions to form polymer with hydrogen cyanide and an aliphatic diisocyanate.

Then, 1.5 grams of triethylamine was added to the reaction solution and additional hydrogen cyanide generated from 0.3 mole of sodium cyanide was passed through the reaction solution. The temperature spontaneously rose to 48° C. and the solution became viscous. Then, 50 ml. of methyl alcohol was added to the reaction solution to react with the isocyanate end-groups to block their further reaction with the imino groups on the imidazolidine rings which would produce a cross-linked polymer. A cream-colored product weighing 16 grams was obtained. The polymer was soluble in chloroform, tetrahydrofuran, formic acid, pyridine, dimethylformamide, and dimethylsulfoxide. The polymer had an inherent viscosity of 0.11 in dimethylformamide (C, 0.5 gram/100 ml.) at 25° C.

EXAMPLE 5

To a solution of 41.5 grams (0.24 mole) of toluene diisocyanate, 6.8 grams (0.24 mole) of hydrogen cyanide, and 210 grams of toluene at 6° C. is added two (2) ml. of pyridine. The reaction solution is allowed to warm to room temperature and after three (3) hours a fine precipitate begins to fall out of solution. After 90 hours, the product is collected on a filter and washed with petroleum ether to give a pale yellow product weighing 39 grams. The inherent viscosity was 0.06 in dimethylformamide (C, 0.5 gram/100 ml.) at 25° C. Infrared absorption showed maxima at 3.06, 4.41, 5.52, 5.72 and 5.96 microns. A film is formed upon heating at 400° F.

The two foregoing examples illustrate that the formation of polymer by the reaction of hydrogen cyanide with a diisocyanate requires a compound active enough to promote all three reactions involved, and further that the aromatic diisocyanates are more reactive than the aliphatic diisocyanates. It is noted, however, that polymer may be produced in small amounts by the reaction of hydrogen cyanide and hexamethylene diisocyanate in the presence of pyridine at elevated temperature, but at elevated temperatures there occurs greater cross-linking.

EXAMPLE 6

To a solution of 0.5 mole 4,4'-diisocyanato-3,3'-dimethyldiphenyl, 400 ml. of dimethylformamide and 10 ml. of triethylamine is added dropwise 0.5 mole of acetone cyanohydrin at 52°–56° C. The reaction is exothermic. A yellow colored polymer product is obtained in good yield. The polymer product formed an opaque film which was brittle and had a hard surface.

The foregoing example illustrates that the hydrogen cyanide may be formed in situ to form the polymers or carry out the reactions involved in the present invention.

(II) Reaction of dicyanoformamides with diisocyanates

New heterocyclic polymers of the present invention may also be produced by the reaction of a dicyanoformamide or a mixture of dicyanoformamides with a diisocyanate or a mixture of diisocyanates in an appropriate solvent and using a effective catalyst. The steps involved in the formation of the iminoimidazolidinedione rings are described by reactions (2) and (3) in Part I above. The diisocyanates used in this reaction may be selected from the diisocyanates set forth and illustrated above in Formula II. The dicyanoformamides are prepared from these same diisocyanates and have the following general structure:

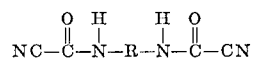

where:

R is the organic moiety of the diisocyanate from which the dicyanoformamide was prepared.

As was set forth in Part I above, the formation of the heterocyclic rings in the polymer chain involves a series of three reactions. The polymer formed by the reaction of dicyanoformamides with diisocyanates involves directly reactions (2) and (3) set forth in Part I. As is illustrated in the reactions, a catalyst is required. The choice of catalysts to produce in high yield the hydrogen cyanide adduct, namely, the dicyanoformamide, of the diisocyanate without the formation of polymer has been found to be dependent upon the type of organic moiety in the diisocyanate as well as the conditions under which the reaction is carried out. As pointed out in Part I, compounds such as the tertiary amines at room temperature conditions will promote all three reactions. Even less basic catalysts such as pyridine will promote polymer formation when the organic moiety of the diisocyanate is aromatic. However, there is a wide variety of effective catalysts for producing the dicyanoformamides in high yield which include such heterocyclic bases as pyridine; 2-picoline; 4-picoline; 2,6-lutidine, N,N-dimethylaniline and the like. The choice of compounds which will catalyze the reaction of diisocyanates with dicyanoformamides is even a wider variety of compounds. These compounds include the tertirary nitrogen compounds which have no active hydrogen atoms including the tertiary amines such as triethyl amine, triethylene diamine, 1-aza 3,3,7,7-tetramethyl bicyclo (3.3.0) octane, 1-methyl piperidine, N,N-dimethylaniline, N-methyl dicyclohexylamine, N,N-dimethylcyclohexyl amine, N-cyclohexylpiperidine, and N-cyclohexyl morpholine; heterocyclic bases such as pyridine, 2-picoline, 4-picoline, 3-picoline, 2,6-lutidine, 2,4-lutidine, and quinoline; phosphorus compounds such as triphenyl phosphine and tributyl phosphine; tin compounds such as dibutyl tin dilurate, dibutyl tin diacetate, bis(tributyl tin) oxide, dibutyl tin bis(2-ethylhexoate), dibutyl tin bis(isooctylmaleate3, and tetrabutyl tin; and lead compounds such as trimethyl plumbyl acetate and 1 - (tri-n-butyl plumbyl) imidazole.

Suitable solvents to be used in forming polymers of the present invention by the reaction of dicyanoformamides with diisocyanates are preferably those in which the products formed by reactions (2) and (3) are soluble. The dipolar aprotic solvents such as dimethylformamide, dimethylacetamide, dimethylsulfoxide, hexamethylphosphoramide and the like are preferred. However, in the reactions using a diisocyanate having an aliphatic hydrocarbon moiety, aromatic solvents such as benzene, toluene, xylene, chlorobenzene, and the like are suitable. The choice of solvent may be important in certain instances since the molecular weight of the polymer formed may be limited by its solubility in the solvent used in the reaction. Anhydrous solvents are used since water will react with the isocyanate group.

The reaction of dicyanoformamides with diisocyanates to produce the heterocyclic polymers of the present invention is normally carried out under ambient and anhydrous conditions. The reaction may be carried out at temperatures between 5° and 30° C. The reaction of dicyanoformamides with diisocyanates may be carried out at elevated temperatures without using pressure equipment. Some dicyanoformamides are stable up to 130° C. Further, since free hydrogen cyanide is not present in this reaction it is not essential to eliminate oxygen from the reaction vessel, however, in the preferred conditions an inert atmosphere such as nitrogen may be used.

The reaction of a dicyanoformamide or a mixture of dicyanoformamides with a diisocyanate or a mixture of diisocyanates to produce the heterocyclic polymers of the present invention can be carried out by adding a catalyst to the reaction solution of the dicyanoformamide and diisocyanate or, preferably, by adding the diisocyanate to a solution of the dicyanoformamide and the catalyst in a solvent. Since the reaction is exothermic, the reaction temperature is more easily controlled when the latter technique is used. Also little dissociation of the dicyanoformamide occurs in solution and there is less cross-linking in the polymers formed when the diisocyanate is added to the solution of dicyanoformamide and catalyst. It has been found, however, that if the temperature is increased substantially cross-linking increases. Furthermore, if a small excess of diisocyanate is added to the solution, a cross-linked polymer will result and gellation will occur.

The heterocyclic polymers produced by the reaction of a dicyanoformamide with a diisocyanate contain repeating units which include two imidazolidine rings and the organic moiety ($R_1$) from the diisocyanate and the organic moiety ($R_2$) from the dicyanoformamide. The polymer thus may be characterized by the following general repeating unit:

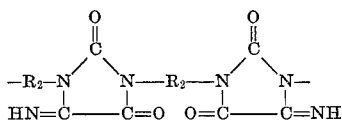

where:

$R_1$ is the organic moiety from the diisocyanate, and
$R_2$ is the organic moiety from the dicyanoformamide.

The polymers produced by this step-growth polymerization method are further characterized by the methodical alternation of the oxo and imino groups between positions 4 and 5 on the sequential imidazolidine rings in the polymer chains. The mode of formation of the imidazolidine rings is considered to be responsible for this alternating regularity. The two imidazolidine rings are formed on either end of the dicyanoformamide with the oxo and imino groups ultimately being located at positions 4 and 5, respectively, on one imidazolidine ring and at positions 5 and 4, respectively, on the other imidazolidine ring. On every imidazolidine ring, each amino group will be attached to the carbon atom adjacent to the nitrogen atom which was derived from the diisocyanate.

When the organic moiety of the diisocyanate differs from the organic moiety of the dicyanoformamide, polymers having different structures may be produced. This may be best illustrated by the following specific example where equimolar quantities of the dicyanaformamide and diisocyanates are employed.

In the case of the reaction of hexamethylene dicyanoformamide (illustrating a dicyanoformamide having an aliphatic organic moiety) with 4,4'-diphenylmethane diisocyanate, a polymer having the following repeating units is produced:

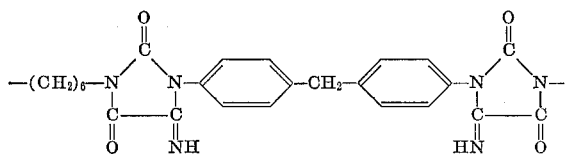

The structural isomer of the foregoing polymer may be prepared by reversing the organic moieties in the monomers; thus, the reaction of equimolar parts of hexamethylene diisocyanate and 4,4'-diphenylmethane dicyanoformamide forms a polymer having the following repeating units:

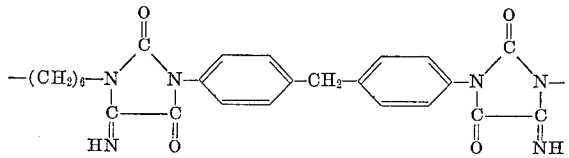

It has been found, that the most reactive diisocyanates and dicyanoformamides are those in which the organic moiety is aromatic. In addition, in the cases where the organic moieties of the two monomers are different, it has been observed that ring closure to form the imidazolidine ring is slower when the organic moiety of the diisocyanate is aliphatic or hindered. As illustrated in the reaction below, the intermediate cyanoformylurea is more easily cyclized when $R_1$ is an electron withdrawing group such as an aromatic ring.

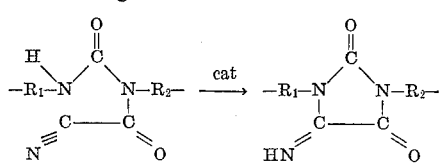

The polymers described above are normally prepared from a reaction solution containing equal molar quantities of a diisocyanate or mixture of diisocyanates and a dicyanoformamide or mixture of dicyanoformamides. If an excess of diisocyanate is present in the reaction solution or if an excess of diisocyanate is added to the polymer, cross-linking reactions occur with consequent gel formation and reduction of the solubility of the polymer. In some instances, complete insolubility of the polymer may result. On the other hand, the presence of an excess of a dicyanoformamide in the reaction solution will limit the molecular weight of the polymer to an extent dependent on the molar excess used. Higher molecular weight polymers may be prepared by the addition of a calculated quantity of diisocyanate to the reaction solution.

The reaction of dicyanoformamides with diisocyanates is illustrated by the following examples, which are set forth for illustration and are not to be considered as limiting the present invention.

EXAMPLE 7

A mixture of 4.4 grams of hexamethylene dicyanoformamide and 3.4 grams of hexamethylene diisocyanate in 20 ml. of dry toluene is heated to 90° C. to bring about solution. Two (2) drops of triethylamine is added and the reaction solution allowed to slowly cool to room temperature. A viscous product separates from solution. Evaporation of the residual solvent leaves a colorless, tacky polymer product. The polymer product had an isocyanate equivalent (end-group analysis) of 530 indicating a molecular weight of 1060. The polymer had an inherent viscosity of 0.09 in dimethylformamide (C, 0.5 grams/ 100 ml.) at 25° C. The infrared spectrum showed typical absorption peaks at 3.04, 4.40, 5.58, 5.77 and 5.98 microns.

EXAMPLE 8

To a solution of 8.4 grams (0.05 mole) hexamethylene diisocyanate, 11 grams (0.05 mole) hexamethylene dicyanoformamide, 50 ml. dry acetone, and 30 ml. dry toluene is added two ml. of triethylamine. The temperature rises (from 22° to 34.5° C. in 26 minutes). After two hours the product is isolated by pouring the solution into an excess of petroleum ether. The supernatant is decanted from the gummy polymer product. After drying in vacuo, the product weighed 15.3 grams. The product had an inherent viscosity of 0.13 in dimethylformamide (C, 0.5 gram/100 ml.) at 25° C. The molecular weight by vapor phase osmometry in dimethylformamide at 100° C. was 1300. The product was soluble in chloroform, tetrahydrofuran, formic acid, chlorobenzene (hot), o-dichlorobenzene (hot), m-cresol, pyridine, dimethylformamide, dimethylsulfoxide, and hexamethylphosphoramide but was insoluble in toluene, acetone, methyl ethyl ketone, i-propanol, and ethyl acetate. The polymer product is characterized as having the following repeating unit:

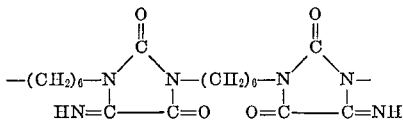

EXAMPLE 9

A solution of 8.4 grams (0.05 mole) of hexamethylene diisocyanate in 25 ml. of dry N-methylpyrrolidone is added dropwise to a solution of 11.1 grams (0.05 moles) of hexamethylene dicyanoformamide and 1 ml. triethylamine in 25 ml. of dry N-methyl pyrrolidone. The reaction is done in a dry flask in a nitrogen atmosphere. The temperature is controlled between 28° and 30° C. during the addition which requires one hour. The reaction solution is then warmed to 35° C. where it remains for 3 hours. The product is precipitated by pouring the solution into a 50:50 mixture of toluene and petroleum ether. The polymer is redissolved into chloroform and precipitated with petroleum ether. The colorless polymer had an inherent viscosity of 0.32 in dimethylformamide (C, 0.5 gram/100 ml.) at 25° C. The polymer was soluble in chloroform, tetrahydrofuran, pyridine, and dimethylformamide. The infrared spectrum showed absorption maxima at 3.09, 4.41 (very weak), 5.55, 5.79 and 5.99 microns. The thermogravimetric analysis curve showed that the polymer was stable up to 330° C. in nitrogen.

The foregoing examples all illustrated the production of polymers by the reaction of a dicyanoformamide and diisocyanate where the organic moiety of the dicyanoformamide and diisocyanate was the same. Accordingly, the polymers produced all had repeating units as illustrated in Example 8. The procedure of Example 9 illustrates the preferred procedure to obtain polymers of the highest molecular weight.

EXAMPLE 10

A solution of 1.25 grams (0.005 mole) of diphenylmethane diisocyanate, 1.52 grams (0.005 mole) of diphenylmethane dicyanoformamide, and 0.5 ml. of dibutyl tin diacetate in 10 ml. of N-methyl pyrrolidone is stirred in a dry nitrogen atmosphere for 18 hours. Little heat, if any, if evolved. The viscous solution is mixed into a 50:50 solution of benzene and petroleum ether. The polymer is collected in a filter and dried. The polymer product had an inherent viscosity of 0.14 in dimethylformamide (C, 0.5 gram/100 ml.) at 25° C. The infrared absorption spectrum exhibited absorption maxima, characteristically, at 3.1, 5.55, 5.75, and 5.99 microns. The polymer product is characterized by having the following repeating unit:

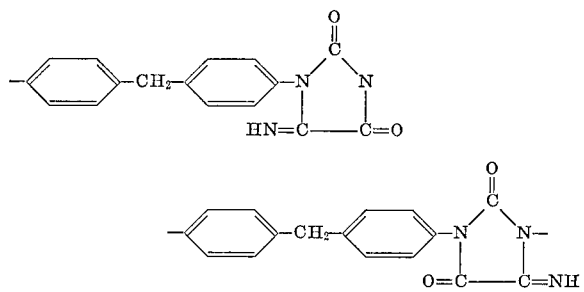

EXAMPLE 11

To a solution of 2.22 grams (0.01 mole) of hexamethylene dicyanoformamide and 1.74 grams of 2,4-toluene diisocyanate in 5 ml. of N-methyl pyrrolidone was added 0.1 ml. triethylamine. Heat was evolved. After 10 minutes the solution is diluted with additional solvent and poured into toluene. A polymer (96% yield) having an inherent viscosity of 0.14 in dimethylformamide (C, 0.5 gram/100 ml.) at 25° C. was obtained. The infrared spectrum of the polymer showed absorption maxima at 3.05, 5.55, 5.75, and 5.95 microns. The polymer is characterized by having the following repeating unit:

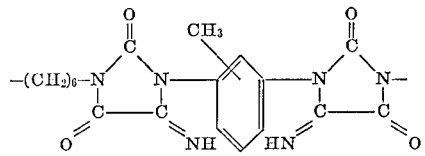

Analysis.—Calculated for polymer having above repeating unit, $(C_{19}H_{20}N_6O_4)_7$ (percent): C, 57.57; H, 5.08; N, 21.19. Found (percent): C, 57.46; H, 5.27; N, 20.52.

EXAMPLE 12

Three (3) ml. of triethylamine are added to a solution of 15.2 grams (0.05 mole) of diphenylmethane dicyanoformamide and 8.4 grams (0.05 mole) of hexamethylene diisocyanate in 60 ml. dimethylformamide. The temperature rose from 27° to 56° C. within 5 minutes and thirty minutes after the addition of the catalyst solution it had cooled to 37° C. The reaction solution is then poured into toluene to precipitate the polymer. After washing with petroleum ether and drying, the polymer had an inherent viscosity of 0.18 in dimethylformamide, pyridine, dimethylsulforide, and hexamethyl phosphoramide. The infrared spectrum had absorption maxima at 3.06, 4.41, 5.56, 5.75, and 5.98μ which are characteristic of the assigned structure. The polymer is characterized by having the following repeating unit:

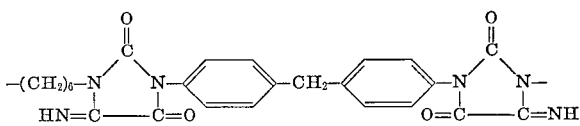

Analysis.—Calculated for polymer having repeating unit above $(C_{25}H_{24}N_6O_4)_n$ (percent): C, 63.55; H, 5.12; N, 17.78. Found (percent): C, 63.25; H, 5.27; N, 17.64.

EXAMPLE 13

Two (2) ml. of triethylamine are added to a solution of 12.5 grams (0.005 mole) of diphenylmethane diisocyanate and 11.1 grams (0.005 mole) hexamethylene dicyanoformamide in 60 ml. dimethylformamide. The exothermic reaction raised the temperature from 23° to 75° C. within 15 seconds. The polymer is isolated after two hours by pouring the reaction solution into toluene. The yield of colorless polymer was 22.6 grams (96%). The polymer had an inherent viscosity of 0.33 in dimethylformamide (C, 0.5 gram/100 ml.) at 25° C. The polymer was soluble in chloroform, m-cresol, pyridine, dimethylsulfoxide, and hexamethyl phosphoramide. The polymer is characterized by having the following repeating unit:

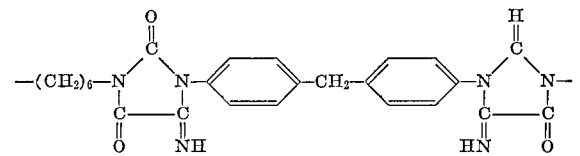

A film was formed from the polymer which had a tensile strength at failure of 10,600 p.s.i. and a 1% secant modulus of 385,200 p.s.i. when drawn at the rate of 0.5 inch per minute.

The foregoing Examples 12 and 13 illustrate that two isomeric polymers may be formed which differ by the position of imino group on the imidazolidine ring. As pointed out heretofore, the imino group is attached to the carbon atom adjacent the nitrogen atom derived from the diisocyanate. It is also noted that the reaction in Example 13 is more vigorous where the diisocyanate has an aromatic moiety as seen by the temperature increase.

The following example illustrates the effect of elevated temperature on polymer solubility. At elevated temperatures greater cross-linking occurs.

EXAMPLE 14

To a solution of 1.68 grams (0.001 mole) of hexamethylene diisocyanate and 2.22 grams (0.1 mole) of hexamethylene dicyanoformamide in 5 ml. N-methylpyrrolidine is added 2 ml. triethylamine at room temperature. The temperature quickly increased to 70° C. due to the exothermicity of the reaction. The temperature was kept at 75° C. for 30 minutes and then slowly increased to 100° C. during the next hour. A gel then formed. The gel was mixed with toluene in a Waring Blender to form a solid polymer which was insoluble in all solvents similarly as set forth in Example 1. Therefore, the polymer appears to be crosslinked. The polymer formed a clear flexible film at 400° F. under 20 tons pressure.

EXAMPLE 15

Hexamethylene dicyanoformamide (quantity below in table) and diphenylmethane diisocyanate (quantity in table below) are dissolved in 5 ml. dimethylformamide and 1 ml. of dimethylformamide containing 0.1 grams triethylamine is added. The products are isolated by precipitation in toluene.

| Experiment | Moles diisocyanate | Moles dicyanoformamide | Time, min. | $\eta$inh. |
|---|---|---|---|---|
| A | 0.004 | 0.005 | 90 | 0.43 |
| B | 0.0055 | 0.005 | 5 | 0.10 |

As noted in the above table, the time required for the reaction is considerably greater when the dicyanoformamide is in excess and a lower inherent viscosity or molecular weight is obtained. The inherent viscosity ($\eta_{inh}$) was measured in dimethylformamide (C, 0.5 gram/100 ml.) at 25° C.

(III) Polymerization of cyanoformamidyl isocyanates

A third procedure for producing the new heterocyclic polymers of the present invention is the head-to-tail polymerization of cyanoformamidyl isocyanates in an appropriate solvent and in the presence of an effective catalyst. The cyanoformamidyl isocyanates have the following general structure:

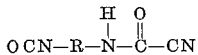

where: R is the organic moiety of the diisocyanate from which the cyanoformamidyl isocyanate was prepared.

The reaction of two moles of hydrogen cyanide with one mole of diisocyanate produces the dicyanoformamides. The formation of cyanoformamidyl isocyanates (the mono adduct of the diisocyanate) involves the same reaction but is the reaction of only one mole of hydrogen cyanide with one mole of diisocyanate. The successful formation of the cyanoformamidyl isocyanate is dependent upon the structure of the diisocyanate, the solvent used for the reaction, the temperature of the reaction, and the compound used to catalyze the reaction. Diisocyanates in which the isocyanate groups do not have equivalent reactivity form the cyanoformamidyl isocyanate much more easily than those in which the isocyanate groups have equivalent reactivity. The most favorable conditions for the formation of the cyanoformamidyl isocyanate are low temperature, the use of a solvent in which the product has low solubility while the starting diisocyanate has a high solubility, and the use of a catalyst which does not catalyze the further reation of a cyanoform amidyl group with an additional isocyanate group under the reaction conditions.

The formation of the heterocyclic rings in the polymers of the present invention produced by the polymerization of cyanoformamidyl isocyanates involves directly reactions (2) and (3), which are set forth in Part I above. As is illustrated in the reactions, a catalyst is required. In the polymerization of the cyanoformamidyl isocyanates, the choice of compounds which will catalyze the reaction is the same wide variety of compounds which will catalyze the reaction of diisocyanates and dicyanoformamides illustrated above. Thus, effective compounds which will catalyze the polymer forming reactions include the tertiary amines such as triethylamine and triethylenediamine and the like; heterocyclic bases such as pyridine, picolines, lutidiness; and the phosphorus, tin and lead compounds illustrated in Part II above.

The polymerization of cyanoformamidyl isocyanates may be carried out in a suitable solvent such as the dipolar aprotic solvents, such as dimethylformamide, dimethylsulfoxide, hexamethylphosphoramide and the like which are preferred. The polymerization is carried out preferably under ambient and anhydrous conditions. The preferred temperatures are within the range of 10° to 35° C. At higher temperatures increased crosslinking occurs so that insoluble polymers are produced.

The polymerization of cyanoformamidyl isocyanates is tion of a cyanoformamidyl isocyanate contain repeating units which include two imidazolidine rings. The polymer may be characterized by the following general repeating unit:

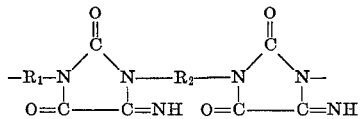

where: $R_1$ and $R_2$ are the organic moiety from the cyanoformamidyl isocyanate.

The polymers produced by the polymerization of a single cyanoformamidyl isocyanate will have repeating units where $R_1$ and $R_2$ are the same; however, $R_1$ and $R_2$ may be different if a mixture of cyanoformamidyl isocyanates are used. The polymers produced by the polymerization of cyanoformamidyl isocyanates are thus characterized by the imino and oxo groups on the imidazolidine rings being located in the same position (4 and 5 respectively) on each sequential imidazolidine ring. The particular structure of the polymers produced using a mixture of cyanoformamidyl isocyanates is dependent upon the reactivity of the respective cyanoformamidyl isocyanates and thus block or random copolymers may be produced.

The polymerization of cyanoformamidyl isocyanates is illustrated by the following examples, which are set forth for illustration and are not to be considered as limiting the present invention.

EXAMPLE 16

One drop of triethylamine is added to a solution of 1 gram of toluene cyanoformamidyl isocyanate in 3 ml. of dimethylformamide at room temperature. Heat is liberated. After three (3) minutes the product was diluted with toluene to precipitate a polymer which had an inherent viscosity of 0.10 in dimethylformamide (C, 0.5 gram/100 ml.) at 25° C. The infrared spectrum of the product exhibited absorption maximum at 3.05, 4.41 (very weak), 5.55, 5.74, and 5.98 microns.

EXAMPLE 17

To a solution of 6-cyanoformamidyl hexyl isocyanate in N-methyl pyrrolidone is added triethylamine (1 ml.). The reaction solution became warm and very viscous within 10 minutes. After an hour the product was poured into toluene which was then evaporated in vacuo. The clear toluene to precipitate a viscous gum. The organic solvents were decanted from the residue which was then stirred with additional toluene and this toluene again decanted from the product. The viscous gum was again stirred with residue was polymeric. The infrared spectrum of the polymer had absorption maxima at 3.05, 5.55, 5.74, and 5.95 microns. A smear of the polymer on aluminum foil was heated on a hot plate at 100° F., and within five (5) minutes the polymer formed a clear hard film which adhered strongly to the aluminum foil.

Hydrolyzed polymer.—The polymers of the present invention produced by any of the foregoing methods and procedures may be hydrolyzed immediately after their formation without isolating them or the isolated polymers may be redissolved in a suitable solvent and then hydrolyzed. The polymers may be hydrolyzed by reaction with aqueous solutions of acids such as hydrochloric, sulfuric, formic and the like. Hydrolysis occurs rapidly and is usually complete within a few minutes at room temperature. Since the hydrolysis reaction is exothermic, cooling is often necessary. The hydrolyzed polymer may be easily isolated by pouring the reaction solution into water or ice water. The structure of the hydrolyzed polymer is characterized by the presence of the 1,3-imidazolidine-2,4,5-trione-1,3-diyl ring.

The hydrolysis of the polymers formed by the foregoing methods is illustrated by the following examples which are set forth for illustration and are not to be considered limiting the present invention.

EXAMPLE 18

To a cooled (6° C.) solution of 12 grams (0.41 mole) of hydrogen cyanide in 300 grams of dry dimethylformamide is added 60.2 grams (0.4 mole) of toluene diisocyanate (80 percent of the 2,4-isomer and 20 percent of the 2,6-isomer). The temperature rose from 6° to 54° C. within 7 minutes. The solution remained at 54° C. for 3 minutes and then was slowly cooled over a period of 50 minutes to 30° C. To a portion of the reaction solution diluted with 50 ml. of dimethylformamide was added 120 ml. of 37 percent hydrochloric acid with rapid stirring. Hydrolysis was an exothermic reaction, and a white polymeric material separated from the solution. The product was put in a Waring Blender with ice and stirred, and the resulting solid product was washed with water until neutral to pH paper. The dry product weighed 36 grams. The infrared spectrum exhibited maxima at 2.80, 2.85, and 5.80 (broad) microns. X-ray analysis indicates that this product is amorphous.

It is significant to note that the dimethylformamide was not only a suitable solvent but also appeared to have sufficient catalytic activity with the aromatic diisocyanate to carry out the initial polymerization.

EXAMPLE 19

A portion of the polymer formed according to Example 4 is mixed with 100 ml. of concentrated hydrochloric acid to hydrolyze the imino group on the product. The reaction is extremely exothermic, producing a white product which was collected on a filter, resuspended in acetone diluted with petroleum ether, filtered, and dried. The product had an infrared absorption spectra maxima at 5.8 microns (broad). The polymer was soluble in cold formic acid, dimethylformamide, hexamethylphosphoramide, and dimethylsulfoxide. The polymer was insoluble in cold and hot chloroform, acetone, methylethylketone, tetrahydrofuran, ethylacetate, and pyridine. The polymer had an inherent viscosity of 0.08 in dimethylformamide (C, 0.5 gram/100 ml.) at 25° C.

EXAMPLE 20

A reaction solution formed according to Example 9 was diluted slowly with concentrated hydrochloric acid until a solid began to separate from solution. The reaction was exothermic. The solution was poured into ice and water to precipitate the hydrolyzed polymer which had the following repeating unit:

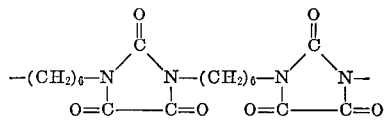

After two purifications by dissolution in dimethylformamide and precipitation in water, the colorless polymer had an inherent viscosity of 0.14 in dimethylformamide (C, 0.5 gram/100 ml.) at 25° C. The polymer is soluble in acetone, tetrahydrofuran, pyridine, dimethylformamide, dimethylsulfoxide, and hexamethylphosphoramide. Thermogravimetric analysis showed it was stable up to about 380° C. in nitrogen.

The hydrolyzed polymer from Examples 19 and 20 both have the same repeating unit as shown in Example 20. As pointed out hereinabove, if the chain length of the linear polymer was the same when produced by the reaction of the diisocyanate with hydrogen cyanide as was produced by the reaction of the diisocyanate with dicyanoformamide, identical polymers would be formed by the hydrolysis.

EXAMPLE 21

To a solution of 4 grams of polymer formed in Example 12 in 40 ml. dimethylsulfoxide was slowly added 10 ml. of 37% hydrochloric acid. The product fell out of solution and slowly solidified and crumbled. After pouring the reaction mixture into ice water, it was filtered and washed with water until neutral to pH paper. After drying it weighed 3.5 grams and had an inherent viscosity of 0.18 in dimethylformamide (C. 0.5 gram/100 ml.) at 25° C. Thermogravimetric analysis in nitrogen showed a weight loss of 3.8% at 250° C. and 4.8% at 330° C.

EXAMPLE 22

A solution of 55 grams (0.22 mole) of diphenylmethane diisocyanate in 125 ml. N-methylpyrrolidone was added to a solution of 44.4 grams (0.20 mole) of hexamethylene dicyanoformamide and 2 ml. triethylamine in 150 ml. N-methylpyrrolidone in a dry nitrogen atmosphere. Addition required one hour and the temperature was controlled at 25°–30° C. by a water bath. After stirring four hours, a half of the reaction solution was poured into toluene to precipitate 47 grams of polymer having an inherent viscosity of 0.70 in N-methylpyrrolidone (C, 0.3 gram/100 ml.) at 25° C. A film formed from the polymer had a tensile strength at break of 11,186 p.s.i. and a 1% secant modulus of 248,000 p.s.i.

Half of the solution of the polymer in N-methylpyrrolidone was diluted by the slow addition of 60 ml. of 37% concentrated hydrochloric acid. The product was poured into water to precipitate 46 grams of hydrolyzed polymer. The polymer had an inherent viscosity of 0.51 in N-methylpyrrolidone (C, 0.5 gram/100 ml.) at 25° C. The hydrolyzed polymer was pressed into a clear film at 660° F. and 20 tons pressure. The polymer had a tensile strength at break of 9000 p.s.i. and a 1% secant modulus of elasticity of 169,500 p.s.i. The clear film showed no weight loss in air or nitrogen at 350° C.

EXAMPLE 23

To a solution of 2.2 grams (0.01 mole) of hexamethylene dicyanoformamide, 2.5 grams (0.01 mole) of diphenylmethane diisocyanate in 20 ml. of dimethylsulfoxide was added 1 ml. of triethylamine. After two hours the solution was poured into water to precipitate a white colorless polymer. The polymer had an inherent viscosity of 0.17 in dimethylformamide (C, 0.5 gram/100 ml.) at 25° C. The molecular weight was found to be 1150 by vapor phase osmometry in dimethylformamide at 100° C. The nuclear magnetic resonance spectrum showed that only about half of the expected imino groups were present. Therefore, about half of the imino groups were hydrolyzed during the precipitation in water. The polymer formed a clear flexible film at 400° F. and 10 tons pressure.

As is illustrated by the foregoing, partial hydrolysis may occur by recovering the polymer in water rather than an organic solvent without using an acid.

It is evident from the foregoing that this invention provides wholly new heterocyclic polymers which have, depending on their exact composition and molecular weights, widely varying properties which adapt them to a variety of uses. The polymers of the present invention may have from two to fifty or more repeating units, the repeating units consisting of two organic moieties and two imidazolidine rings. Heterocyclic polymers of the present invention having ten to thirty-five repeating units are useful for making films, fibers, foams, molded objects and the like. Films from the polymers of the present invention may be made by casting from solution or by forming under heat and pressure. The polymers are also useful in laminates and for making electrical insulators. The high temperature thermal stability of the polymers of the present invention allows them to be used in applications at elevated temperatures.

The polymers of the present invention are solids at room temperature. Most of the soluble polymers melt above 250° C. and many have melting points above 300° C. A soluble unhydrolyzed polymer of the present invention may be produced which upon heating may cross-link to insoluble and infusible polymers especially in the presence of excess isocyanate groups. Thus, the polymers may also be used as thermoset resins.

The nature and objects of the present invention having been completely described and illustrated, what I wish to claim as new and useful and secure by Letters Patent is:

1. A process for producing a heterocyclic polymer having a structure of alternating organic moieties and 1,3-imidazolidine-1,3-diyl rings, said rings being predominantly of the group consisting of:

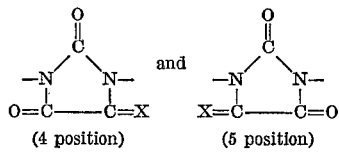

where:

X is selected from the group consisting of NH and N-acyl, and these rings being randomly distributed in their sequence which comprises:

reacting a diisocyanate with hydrogen cyanide in a solvent and in the presence of a catalyst selected from the group consisting of basic nitrogen-containing compounds and the organic compounds of tin, lead and phosphorus at a temperature between 10° and 25° C.

2. A process according to claim 1 wherein said catalyst is selected from the group consisting of organic compounds of tin, lead and phosphorus.

3. A process according to claim 1 wherein hydrogen cyanide is added to a solution of a diisocyanate and catalyst in a solvent.

4. A process according to claim 1 wherein a mixture of a diisocyanate and hydrogen cyanide in a solvent is added to a catalyst solution.

5. A process according to claim 1 wherein a catalyst is added to a mixture of diisocyanate and hydrogen cyanide in a solvent.

6. A process according to claim 1 wherein hydrogen cyanide is generated in situ from a cyanohydrin.

7. A process according to claim 1 wherein hydrogen cyanide is bubbled through a solution of diphenylmethane in pyridine.

References Cited

Oku et al., Die Makromolecular Chemie, 78, pp. 186–193, 1964.

DONALD E. CZAJA, Primary Examiner

M. J. WELSH, Assistant Examiner

161—227; 260—2.5

U.S. Cl. X.R.